Dec. 7, 1965  C. J. SNABES  3,222,077
CARTRIDGE-TYPE SEAL ASSEMBLY
Filed Dec. 31, 1962  2 Sheets-Sheet 1

CASMIR J. SNABES
INVENTOR
BY John L. Faulkner
Jerry J. Beck
ATTORNEYS

Dec. 7, 1965   C. J. SNABES   3,222,077
CARTRIDGE-TYPE SEAL ASSEMBLY
Filed Dec. 31, 1962   2 Sheets-Sheet 2

CASMIR J. SNABES
INVENTOR
BY John R. Faulkner
   Jerry G. Beck
ATTORNEYS

United States Patent Office 3,222,077
Patented Dec. 7, 1965

3,222,077
CARTRIDGE-TYPE SEAL ASSEMBLY
Casmir J. Snabes, Garden City, Mich., assignor to Ford Motor Company, Dearborn, Mich., a corporation of Delaware
Filed Dec. 31, 1962, Ser. No. 248,337
7 Claims. (Cl. 277—40)

This invention relates to a sealing means and more particularly to a nonrotatable mechanical seal assembly placed between a pair of relatively rotatable compressor members to prevent the leakage of pressurized fluid to the compressor case or to the atmosphere.

In a compressor for an air conditioning system, for example, a high-pressure gas such as Freon flows through a series of ports in the face of a rotating cylinder block into a discharge conduit in a stationary housing.

As gas under high pressure will have a tendency to escape through clearances inherent in the assembly of relatively rotatable members, it is the current practice to provide a rotary double face sealing assembly between these members. Sealing elements are usually provided on each side of a series of ports in the shaft of the rotatable member and an intake opening of a discharge conduit in a stationary member. This type of double face seal assembly is attached to the rotating shaft of the rotating member and includes sealing elements, such as O rings, that are positioned intermediate the components of the seal assembly and the surfaces of the rotating member on one side and the stationary member on the other side. These sealing elements prevent the leakage to the case of the compressor or directly to the atmosphere of the high-pressure gas which is being exhausted through the ports to the intake opening. These sealing elements are subject to considerable wear since they abut high-speed rotating surfaces. Frequent tear down of the compressor assembly is required to provide access to the seal assembly to permit inspection and replacement if necessary. Most double face sealing assemblies currently utilized for this purpose are relatively difficult to remove from the compressor and, therefore, the inpection and replacement of the sealing members are time consuming and costly.

Further, such a double face mechanical seal assembly is usually held in place by a key attached to the rotating shaft and, therefore, the torque is transmitted through this key connection to the seal assembly. Failure of the connection may cause the sealing elements between the relatively rotatable members to jam, thereby substantially increasing the cost of their removal.

To overcome these difficulties, the present invention provides an annular-shaped sealing means designed with two nonrotatable sealing elements having coplanar sealing faces in sealing engagement with a ported face of a rotatable member in a compressor assembly. The hydraulic force created by the flow of pressurized fluid through the compressor is utilized to maintain the sealing elements in sealing engagement with the ported face of the rotating part.

In a first embodiment of this invention the sealing elements of the seal assembly are supported in a single annular cartridge positioned intermediate the surfaces of the rotating member and the stationary member of the compressor. This cartridge comprises two concentric annular sealing elements with each sealing element having one face in abutment with the face of the rotating member on each side of a series of ports radially spaced from the shaft of the rotating member. These concentric sealing elements are bonded to concentric annular support members that are nonrotatably held in a housing but which are responsive to axial movement. The housing is formed from two spaced cylindrical members welded together and provided with an opening therebetween to allow for the flow of fluid from the ports to the discharge conduits in the stationary housing. A sealing means is provided between the support members and the cylindrical members to prevent the leakage of fluid around the cartridge. A spring means within the cartridge acts on the support members to provide sufficient spring force on the sealing elements to place them in abutment with the ported face of the rotating member when fluid pressure is not high enough to create sufficient hydraulic force to maintain the sealing elements in sealing engagement with the ported face.

When either one or both of the sealing elements show signs of wear, the cartridge can be readily removed and a new cartridge positioned between the relatively rotatable members, thereby reducing the down time for the compressor.

As the sealing elements are stationary and manufactured from a self-lubricating material, the wear on the sealing faces is substantially reduced resulting in increased life of the seal assembly.

In a second embodiment of this invention, two concentric annular sealing elements are supported by separate retainers replacing the support members and the housing. These retainers are nonrotatably held in a counterbored portion of a stationary housing encompassing the shaft of a rotatable member. The sealing device of this embodiment is of a lower cost but does not have the advantage of being preassembled in a cartridge to facilitate its replacement.

It is an object of this invention to provide an annular-shaped mechanical seal assembly which will provide two concentric sealing elements having coplanar sealing faces in sealing engagement with a ported face of a rotatable member.

A further object of this invention is to provide a nonrotatable mechanical seal assembly incorporated in a cartridge to permit the ready replacement of the entire seal assembly without requiring the tear down of the various components making up the seal.

A further object of this invention is to provide a low-cost annular-shaped seal assembly positionable between relatively rotatable members which utilizes the hydraulic force effected by the flow of pressurized fluid through a compressor to maintain the sealing elements in sealing engagement with a ported face.

Other advantages of this invention will become more apparent as this description proceeds, particularly when considered in connection with the accompanying drawings wherein.

Figure 1:
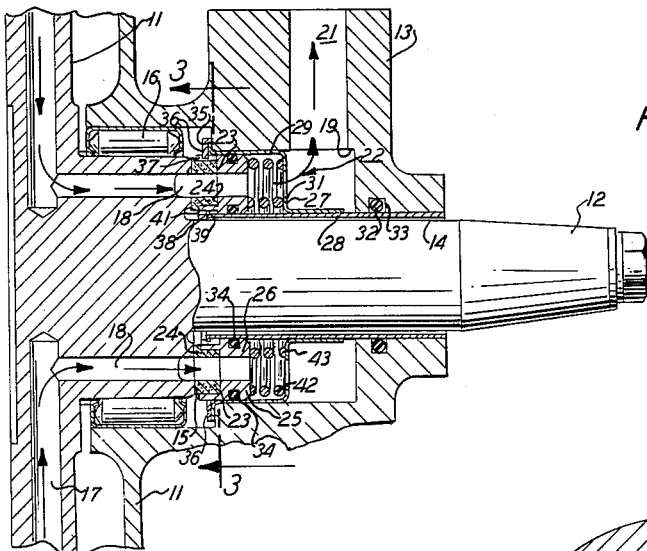
FIGURE 1 is a partial sectional view of a compressor assembly depicting an annular seal assembly of a first embodiment of this invention positioned intermediate two relatively rotatable members.
Figure 2:
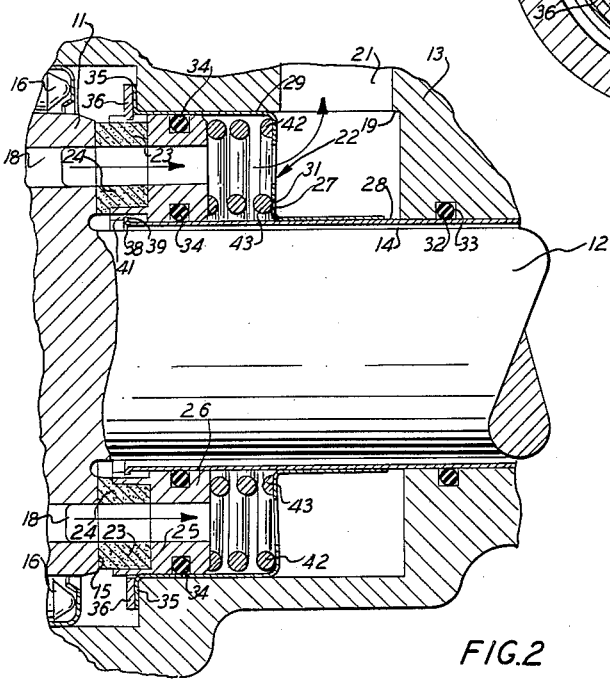
FIGURE 2 is an enlarged sectional view of a portion of the compressor assembly depicting in more detail the annular seal assembly of FIGURE 1.

In FIGURE 1 is shown (in section) a portion of a compressor assembly comprising a segment of a rotating cylinder block 11 which is integrally formed with a stub shaft 12. A drive (not shown) can be attached to the shaft 12 for rotating the cylinder block 11. A stationary housing 13 having a bore 14 is placed around the shaft 12 so that the housing 13 is adjacent to a vertical end face 15 of the rotating cylinder block 11. Needle bearings 16 are positioned intermediate the rotating block 11 and the stationary housing 13 to retain the two relatively rotatable members in alignment. Internal conduits 17 in the rotating cylinder block 11 transmit fluid, such as Freon gas, for instance, from cylinders (not shown) to a series of ports 18 in the vertical end face 15 as best seen in FIGURE 2. As will be understood, the pressure of the fluid being discharged through the series of ports 18 will be proportional to the speed of rotation of the rotating cylinder block 11.

The bore 14 in the stationary housing 13 has a counterbore 19 through which the shaft 12 extends. A discharge conduit 21 in the stationary housing 13 is placed in communication with the counterbore 19 to allow for the continuous flow of fluid discharged through the ports 18 to other parts of the compressor (not shown).

To prevent the leakage of fluid from its intended flow path, a seal assembly of a first embodiment of this invention, generally designated as 22, is provided between the vertical end face 15 of the rotating cylinder block 11 and the discharge conduit 21 in the stationary housing 13. As best seen in FIGURE 2, this seal assembly 22 comprises a first annular sealing element 23 and a second annular sealing element 24 concentrically spaced around the shaft 12. Both sealing elements 23 and 24 have one end face in abutment with the vertical end face 15 of the rotating cylinder block 11. The first annular sealing element 23 abuts the face 15 outwardly of the series of ports 18 while the second annular sealing element 24, concentrically spaced from the first sealing element 23, abuts the same vertical end face 15 inwardly from the series of ports 18. Both sealing elements 23 and 24 are formed from a graphite or other self-lubricating material that is relatively impervious to the fluid being discharged from the ports 18.

The first sealing element 23 and the second sealing element 24 are partially encompassed by and bonded to a first annular support member 25 and a second annular support member 26, respectively. The annular support members 25 and 26 are concentrically spaced from each other to allow for the continuous flow of fluid therethrough. A housing 27 in the general shape of a cylinder is provided to receive the sealing elements 23 and 24 and the support members 25 and 26 to form a unitary annular cartridge. The housing 27 has an inside cylindrical wall 28 which encompasses the shaft 12 with sufficient clearance so as not to interfere with the rotation of the shaft 12. An outside cylindrical wall 29 of the housing 27, which is shorter than the inside cylindrical wall 28, has an end wall 31 which is welded to the inside wall 28 intermediate its ends. The outside cylindrical wall 29 encompasses the outside diameters of the first sealing element 23 and the first support member 25.

A first sealing O ring 32 is positioned in a groove 33 cut into the face of the stationary housing 13 to provide a seal between the inside cylindrical wall 28 and the stationary housing 13 outward of the counterbore 19. Other sealing O rings 34 are placed intermediate the first and second annular support members 25 and 26 and the surfaces of the housing 27 to prevent leakage of fluid through the needle bearings 16 to the case of the compressor.

Figure 3:
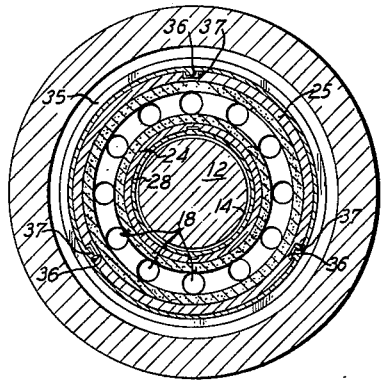
FIGURE 3 is a sectional view taken along line 3—3 of FIGURE 1.

One end of the outside cylindrical wall 29 is bent over to form an outwardly extending flange 35 to maintain the housing 27 of the cartridge in a fixed position in the counterbore 19. Inwardly directed tabs 36 are attached to the flange 35 at three radially spaced points. These tabs 36 extend into three slots 37 cut into the outer periphery of the first support member 25 as seen in FIGURES 2 and 3. These slots 37 in the first support member 25 are spaced in a cooperative relationship with the tabs 36 to nonrotatably hold the first support member 25 and the first sealing element 23 bonded thereto in the housing 27. A second flange 38 is formed by bending inwardly the end portion of the inside cylindrical wall 28 to form tabs 39 at two locations to engage two corresponding slots 41 in the second support member 26 to also non-rotatably hold the latter and the second sealing element 24 bonded thereto in the housing 27. Ample clearance is provided between the tabs 36 and 39 and their respective slots 37 and 41 to permit axial movement of the support members 25 and 26 relative to the housing 27. The end wall 31 may have a series of openings punched therethrough to permit the fluid to pass through the seal assembly 22 and the counterbore 19 to the discharge conduit 21 in the stationary housing 13.

A first coil spring 42 is placed between the first support member 25 and the inside surface of the end wall 31. A second coil spring 43, which has a smaller diameter than the first spring 42, is positioned between the second support member 26 and the end wall 31. Both coil springs 42 and 43 urge the pair of sealing elements 23 and 24 into engagement with the vertical end face 15 of the rotatable cylinder block 11.

Figures 4, 5:
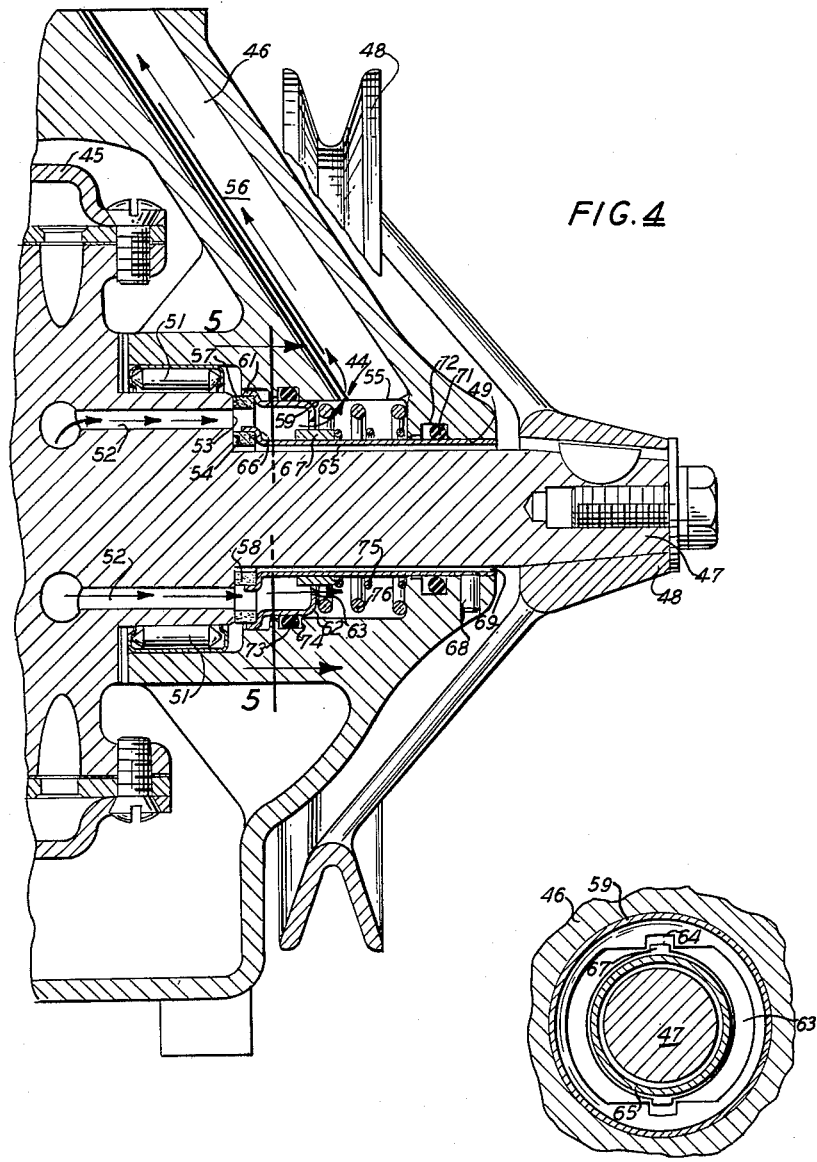
FIGURE 4 is a partial sectional view of a compressor assembly depicting a seal assembly of a second embodiment of this invention positioned between two relatively rotatable members; and, FIGURE 5 is a sectional view taken along line 5—5 of FIGURE 4.

In FIGURE 4 is seen a second embodiment of a seal assembly of this invention generally designated as 44. The seal assembly 44 is positioned between a rotatable cylinder block 45 and a stationary housing 46 in a compressor assembly similar in structure and in function to the compressor shown in FIGURE 1. The rotatable cylinder block 45 is integrally formed with a stub shaft 47 to which a drive pulley 48 is attached in a known manner. The stationary housing 46 is provided with a center bore 49 which encompasses the stub shaft 47 intermediate the rotating cylinder block 45 and the connection for the pulley 48. Needle bearings 51 are positioned between the relatively rotatable members to maintain the compressor components in alignment.

Fluid, such as Freon gas, flows from cylinders (not shown) in the rotating cylinder block 45 under pressure through internal conduits 52 to a series of ports 53 in a vertical end face 54 of the cylinder block 45. The series of ports 53 are radially spaced from the center axis of the stub shaft 47. The stationary housing 46 is provided with a counterbore 55 which is machined into the housing 46 from the surface that is adjacent the vertical end face 54 of the rotatable cylinder block 45. A discharge conduit 56 is placed in communication with the counterbore 55.

The seal assembly 44 comprises a first annular sealing element 57 having one face abutting the end face 54 of the cylinder block 45 radially outwardly of the series of ports 53. A second annular sealing element 58 has one face lying in the same plane as the one face of the first sealing element 57 and also abuts the vertical end face 54 of the cylinder block 45, but it is radially spaced inwardly of the series of ports 53. Both sealing elements 57 and 58, which encircle the radially spaced ports 53, may be manufactured from a graphite or other self-lubricating material.

The first sealing element 57 is maintained in abutment with the end face 54 by a cylindrical retainer 59. One end of the retainer 59 has an offset 61 to which a portion of the first sealing element 57 is bonded. The other end of the cylindrical retainer 59 is provided with an end wall 62 having an opening 63 therein. The opening 63 is generally circular in shape with parallel chord segments reducing the opening 63. A slot 64 extends into each chord segment of the opening 63 as best seen in FIGURE 5.

An inner bushing 65 encircles the shaft 47 with clearance provided between the periphery of the shaft 47 and the inside wall of the bushing 65. One end portion of the bushing 65 has an offset 66 to which the second annular sealing element 58 is bonded. A pair of tabs 67 are welded to the outside wall of the bushing 65 intermediate its ends so that they extend into the slot 64 cut into the periphery of the opening 63 of the first cylindrical retainer 59 to nonrotatably hold the latter with respect to the bushing 65.

The bushing 65 is nonrotatably held in the stationary housing 46 by a pin 68 which extends into a slit 69 cut inwardly from the other end of the bushing 65. An O sealing ring 71 is positioned in a groove 72 in the stationary housing 46 so that it abuts the outer surface of the bushing 65 at its other end. A second O sealing ring 73 is positioned in a groove 74 in the stationary housing 46. This O sealing ring 73 abuts the outers surface of the cylindrical retainer 59. Both O sealing rings 71 and 73 prevent the leakage of gas to the case of the compressor assembly or to the atmosphere.

A first coil spring 75 is inserted in the counterbore 55 between the end face of the counterbore 55 and the pair of tabs 67 attached to the bushing 65. A second coil spring 76 is positioned intermediate the end face of the counterbore 55 and the end wall 62 of the cylindrical retainer 59 adjacent the opening 63 therein. The cylindrical retainer 59 and the inner bushing 65 are movable in an axial direction relative to the shaft 47.

It can be seen that the seal assemblies 22 and 44 of this invention comprise two concentric annular sealing elements having coplanar sealing faces in sealing engagement with the face of a rotating cylinder block on each side of a series of radially spaced ports in the end face of the block. The annular sealing elements are nonrotatably held in abutment with the end face by retaining members or support members.

The sealing elements 23 and 24 are maintained in sealing engagement with the end face 15 by the unbalanced hydraulic force acting on these elements. For example, sealing element 24 is pressed toward end face 15 by a sealing force equal to the pressure of the gas flowing by the end of support member 26 multiplied by the effective area of the end of member 26. This effective area equals $\pi(R_a^2 - R_b^2)$ where $R_a$ is the outside radius of member 26 and $R_b$ is the radius of the positive sealing surface established by O ring 34. Because sealing element 24 ordinarily contacts end face 15 at some point within the edge of port 18, gas pressure also acts on a portion of sealing element 24 facing end face 15. This pressure produces a countering force calculated in a similar manner acting in a direction opposed to the sealing force. The unbalanced hydraulic force maintaining element 24 in sealing engagement with end face 15 is the difference between the sealing force and the countering force. A similar analysis is used to calculate the unbalanced hydraulic force maintaining element 23 in sealing engagement with end face 15.

Unbalanced hydraulic forces will also be established in a similar fashion on the first annular sealing element 23 in the first embodiment and the annular sealing elements 57 and 58 in the second embodiment of this invention.

When the flow of gas is at an insufficient pressure as, for example, when the cylinder block is rotating at a relatively low speed during start up of the compressor, the sealing elements are maintained in sealing engagement by the spring means provided.

In the first embodiment, the seal assembly 22 includes a housing 27 which contains the sealing elements 23 and 24 and support members 25 and 26 to form a cartridge. Upon the removal of the stationary housing 13 from the stub shaft 12, this cartridge can be readily slipped off and replaced with a new one when the sealing elements 23 and 24 have been found to be defective.

In the second embodiment of this invention, a separate inner bushing 65 and cylindrical retainer 59 are utilized to support the sealing elements 57 and 58 without being encompassed in a housing. This results in a lower cost seal assembly 44 but has the disadvantage of not being as readily serviceable as the cartridge of the first embodiment.

As the sealing elements of this invention in contact with the rotatable members are self-lubricating and nonrotatably held in the compressor, the wear on their coplanar sealing faces is minimized. Thus, much less frequent replacement of the seal assembly 22 and 44 is required. Further, the seal assembly 22 and 44 of this invention achieves a better seal by the ultilization of a hydraulic force created when pressurized gas flows through the compressor. The spring force provided by the spring means acting on the sealing elements is an auxiliary force which is only required when the pressure of the gas falls below a predetermined value to assure that the axially movable sealing elements remain in engagement with the end face of the rotatable member.

It is to be understood that the form of this invention is not to be limited to the exact construction shown and described but that various changes and modifications may be made without departing from the spirit and scope of the invention as defined in the appended claims.

I claim:

1. A sealing device to effect a pressurized fluid seal between a stationary member and a rotatable member, said rotatable member having at least one pressurized fluid discharge port in a face thereof, and said stationary member having a counterbore and a discharge conduit in communication with said counterbore; said sealing device being nonrotatably positioned in said counterbore and comprising a pair of concentric annular sealing elements with each sealing element being placed in abutment with said face on opposite sides of said port, a pair of concentric annular support members with each support member being in abutment with one of said pair of sealing elements respectively, and a generally cylindrically shaped housing sealingly received in said counterbore intermediate said face and said discharge conduit, said housing nonrotatably receiving said pair of sealing elements and said pair of support members, means for providing a seal between said pair of support members and said housing, said sealing elements being urged into sealing engagement with said face by an axial force exerted by pressurized fluid flowing from said port through said spaced support members to said discharge conduit.

2. A seal assembly to effect a seal between a stationary member and a rotatable member including a shaft, said rotatable member having a vertical face with a series of ports therein radially spaced from said shaft, said ports adapted to discharge a gas increasing with pressure as the speed of rotation of said rotatable member increases, said stationary member having a counterbore encompassing said shaft, and a discharge conduit in communication with said counterbore; said seal assembly comprising a pair of concentric annular sealing elements with each element being placed in abutment with said face of said rotatable member on opposite sides of said ports, each support member being bonded to one of said pair of sealing elements respectively, an apertured cylindrical housing sealingly received in said counterbore intermediate said face and said discharge conduit, said housing sealingly receiving said pair of support members and said sealing elements bonded thereto, and spring means between said cylindrical housing and said support members, said spring means placing said sealing elements in abutment with said face, said sealing elements being urged into sealing engagement with said face under the influence of an axial force exerted by gas flowing from said ports to said discharge conduit when the speed of said rotating member is increasing.

3. A sealing device to effect a pressurized fluid seal between a stationary member and a rotatable member, said rotatable member having at least one port in one end face thereof, said one port adapted to discharge a pressurized fluid therefrom, said stationary member having a counterbore and a discharge conduit in communication with said counterbore; said sealing device being nonrotatably positioned in said counterbore and comprising a pair of concentric annular sealing elements with each element being placed in abutment with said face on opposite sides of said port, a pair of concentric annular support members with each support member being in abutment with one of said pair of sealing elements respectively, and a generally cylindrically shaped housing sealingly received in said counterbore intermediate said face and said discharge conduit, said housing nonrotatably receiving said pair of sealing elements and said pair of support members, means for providing a seal between said pair of support members and said housing, said sealing elements being urged into sealing engagement with said face by an axial hydraulic force exerted by pressurized fluid flowing from said port through said spaced support members to said discharge conduit.

4. A sealing device to effect a seal between a stationary member and a rotatable member, said rotatable member having a port in a face thereof, said port adapted to discharge a pressurized fluid upon rotation of the rotatable member, said stationary member having a counterbore and a discharge conduit in communication with said counterbore; said sealing device being nonrotatably positioned in said counterbore and comprising a first annular sealing element placed in abutment with the face of said rotatable member on one side of said port, a second annular sealing element concentric with said first sealing element and being placed in abutment with said face on the opposite side of said port radially outward from the first sealing element, a first and a second annular support member, said first and second annular support members being bonded to said first and second annular sealing elements respectively, a cylindrical apertured housing nonrotatably sealingly positioned in said counterbore intermediate with said face and said discharge conduit, said housing nonrotatably supporting said pair of sealing elements and said pair of support members, annular seals between said pair of support members and said housing, and spring means intermediate said cylindrical housing and said support members, said sealing elements being responsive to axial forces exerted by said spring means and pressurized fluid upon flowing from said ports through apertures in said housing to maintain said sealing elements in sealing engagement with said face.

5. A sealing device to effect a seal between a stationary member and a rotatable member including a shaft, said rotatable member having a series of ports in a face thereof radially spaced from said shaft, said ports adapted to discharge a gas increasing in pressure as the speed of rotation of said rotatable member is increased, said stationary member having a counter bore encircling said shaft and a discharge conduit in communication with said counterbore; said sealing device comprising a first annular sealing element positioned in a concentric relationship with said shaft and in abutment with said face of said rotatable member inward of said series of radially spaced ports, a second annular sealing element positioned in a concentric relationship with said shaft and in abutment with said face of the rotating member outward of said series of radially spaced ports, a first annular support member bonded to said first sealing element, a second annular support member bonded to said second sealing element, a cylindrical housing nonrotatably sealingly positioned in said counterbore intermediate said face and said discharge conduit, said housing having an end wall provided with an opening, said housing supporting said pair of sealing elements and said pair of support members, sealing means between said pair of support members and said housing, and spring means intermediate said end wall of said cylindrical housing and said support members, said sealing elements being responsive to axial forces exerted by said spring means and pressurized fluid upon flowing from said ports through said opening in the end wall to maintain said sealing elements in sealing engagement with said face.

6. A sealing device to effect a seal between a stationary member and a rotatable member including a shaft, said rotatable member having a series of ports in an end face thereof radially spaced from said shaft, said ports adapted to discharge a gas under pressure, said stationary member having a counterbore portion encircling said shaft and a discharge conduit in communication with said counterbored portion; said sealing device comprising a first annular sealing element positioned in a concentric relationship with said shaft and in abutment with said end face of said rotatable member radially inward of said series of ports, a second annular sealing element positioned in a concentric relationship with said shaft and in abutment with said end face of said rotating member radially outward of said series of ports, a first annular support member bonded to said first sealing element, a second annular support member bonded to said second sealing element, a cylindrical housing nonrotatably sealingly positioned in said counterbored portion intermediate said end face and said discharge conduit, said housing having an end wall provided with an opening, said housing nonrotatably receiving said pair of sealing elements and said pair of support members, sealing means between said pair of support members and said housing, a first spring between said first support member and said end wall of said housing to maintain said first sealing element in abutment with said end face, a second spring member intermediate said end wall and said second support member to maintain said second sealing element in abutment with said end face, said sealing elements being urged into sealing engagement with said face under the influence of an axial force exerted by gas flowing from said ports to said discharge conduit when the speed of said rotating member is increasing.

7. The device described in claim 4 and which is further characterized in that said housing comprises an inner bushing encircling said shaft and an outer cylindrical retainer concentrically spaced from said inner bushing, said outer cylindrical retainer having an end wall with an opening therein which is attached to said inner bushing intermediate its ends.

References Cited by the Examiner

UNITED STATES PATENTS

| | | | |
|---|---|---|---|
| 2,469,588 | 5/1949 | Aschauer | 277—74 |
| 2,653,833 | 9/1953 | Barron | 277—72 |
| 2,679,412 | 5/1954 | Whitfield | 277—74 |
| 2,801,117 | 7/1957 | Bourgeois et al. | 277—96 XR |
| 2,945,706 | 7/1960 | Franked | 277—74 |

SAMUEL ROTHBERG, *Primary Examiner.*